US012246944B2

(12) United States Patent
Liu et al.

(10) Patent No.: US 12,246,944 B2
(45) Date of Patent: Mar. 11, 2025

(54) ELEVATOR TRACTION MACHINE INSTALLATION APPARATUS AND ELEVATOR TRACTION MACHINE INSTALLATION METHOD

(71) Applicant: Otis Elevator Company, Farmington, CT (US)

(72) Inventors: Wenxiang Liu, Hangzhou (CN); Ming Chen, Hangzhou (CN); Chenfeng Shi, Hangzhou (CN); Jianfeng Wu, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/388,574

(22) Filed: Nov. 10, 2023

(65) Prior Publication Data

US 2024/0262656 A1 Aug. 8, 2024

(30) Foreign Application Priority Data

Feb. 7, 2023 (CN) ......................... 202310125320.9

(51) Int. Cl.
*B66B 19/00* (2006.01)

(52) U.S. Cl.
CPC .................................. *B66B 19/005* (2013.01)

(58) Field of Classification Search
CPC ... B66B 19/005; B66B 19/00; B66B 11/0035; B66B 11/004; B66B 11/0045
See application file for complete search history.

(56) References Cited

U.S. PATENT DOCUMENTS

2015/0107186 A1 4/2015 Wilts et al.
2019/0100419 A1* 4/2019 Bowling .................. B66F 7/28

FOREIGN PATENT DOCUMENTS

JP 2000034072 A * 2/2000 ........... B66B 19/005
JP 2000169059 A 6/2000
JP 2007204238 A * 8/2007
WO WO-0208109 A1 * 1/2002 ........... B66B 19/007
WO WO-2011051559 A1 * 5/2011 ......... B66B 11/0035
WO WO-2021198282 A1 * 10/2021 ........... B66B 11/004

OTHER PUBLICATIONS

European Search Report for Application No. 24155567.1, Issued May 17, 2024, 7 Pages.

* cited by examiner

*Primary Examiner* — Diem M Tran
(74) *Attorney, Agent, or Firm* — CANTOR COLBURN LLP

(57) ABSTRACT

An elevator traction machine installation apparatus includes a lifting mechanism having a base portion and a load-bearing portion adapted to place an elevator traction machine, the base and load-bearing portions are connected and can rise and lower relative to each other in a longitudinal direction of an elevator hoistway; and a support mechanism configured to be detachably connected with the lifting mechanism and a base for installation of a machine-room-less elevator traction machine in the elevator hoistway to support the lifting mechanism and the elevator traction machine, and having at least two positions at which the base portion is secured, a first position is lower than a second position in the longitudinal direction, and the load-bearing portion is lifted relative to the base portion after the base portion is secured at the first position, and continues to be lifted relative to the base portion.

19 Claims, 8 Drawing Sheets

ELEVATOR TRACTION MACHINE INSTALLATION APPARATUS AND ELEVATOR TRACTION MACHINE INSTALLATION METHOD

FOREIGN PRIORITY

This application claims priority to Chinese Patent Application No. 202310125320.9, filed Feb. 7, 2023, and all the benefits accruing therefrom under 35 U.S.C. § 119, the contents of which in its entirety are herein incorporated by reference.

TECHNICAL FIELD

The present disclosure relates to the technical field of elevators, in particular to an elevator traction machine installation apparatus and an elevator traction machine installation method.

BACKGROUND

With the increasingly high requirement on elevator hoistway space and other aspects, the construction in the elevator hoistway becomes more difficult than before, and the construction situation on site also becomes more complicated, which brings about safety risks. For example, as the space between the base of the elevator traction machine and the top of the elevator hoistway tends to be narrower, while the hook pre-embedded at the top of the elevator hoistway is too long and the chain wheel of the chain block itself is large, there is not enough distance to lift and install the machine-room-less elevator traction machine, thus rendering the traditional way of installing the elevator traction machine ineffective. In addition, since the machine-room-less elevator traction machine is generally heavy, it is normally difficult for the limited number of constructors on site to operate efficiently and there are also operational risks. Therefore, considering the aforementioned situations, there is still a lack of appropriate means to complete the on-site installation of the machine-room-less elevator traction machine in a safe, efficient and satisfactory manner.

SUMMARY

In view of the foregoing, the present disclosure provides an elevator traction machine installation apparatus and an elevator traction machine installation method, so as to solve or at least alleviate one or more of the aforementioned problems and other problems in the prior art.

Firstly, according to one aspect of the present disclosure, an elevator traction machine installation apparatus is provided, which comprises: a lifting mechanism having a base portion and a load-bearing portion adapted to place an elevator traction machine, wherein the base portion and the load-bearing portion are connected and configured to be capable of rising and lowering relative to each other in a longitudinal direction of an elevator hoistway; and a support mechanism configured to be detachably connected with the lifting mechanism and a base for installation of a machine-room-less elevator traction machine in the elevator hoistway to support the lifting mechanism and the elevator traction machine, and having at least two positions at which the base portion is secured, wherein a first position is lower than a second position in the longitudinal direction, and the load-bearing portion is lifted relative to the base portion after the base portion is secured at the first position, and continues to be lifted relative to the base portion after the base portion is adjusted and secured at the second position, until the load-bearing portion is substantially flush with an elevator traction machine installation position on the base in the longitudinal direction, to allow the elevator traction machine to be moved from the load-bearing portion to the elevator traction machine installation position.

In the elevator traction machine installation apparatus according to the present disclosure, optionally, the support mechanism comprises: at least two support parts each comprising a connecting bracket, a diagonal brace member and a first member, wherein the connecting bracket is secured to the base, the first member is connected to the connecting bracket via the diagonal brace member and has a first connecting portion, the first member is secured to a guide rail for installation of the machine-room-less elevator traction machine through the first connecting portion, and the guide rail is connected to the base and extends in the longitudinal direction; at least two second members arranged below the base and in parallel to each other, and spaced in a transverse direction of the elevator hositway, wherein the second member is connected to the first member and has at least two second connecting portions, and the base portion is secured at the first position through the second connecting portions; and at least two third members arranged below the base for connecting the lifting mechanism and the second members, wherein the third member has at least two third connecting portions, the third member and the second member are connected through the third connecting portion and the second connecting portion, and the base portion is secured at the second position through the third connecting portions.

In the elevator traction machine installation apparatus according to the present disclosure, optionally, two of the support parts in the support mechanism are arranged at a first end and a second end opposite to each other on the base.

In the elevator traction machine installation apparatus according to the present disclosure, optionally, the connecting bracket is configured in an L-shape, one part of which is secured to top of the base and the other part of which is connected to the diagonal brace member.

In the elevator traction machine installation apparatus according to the present disclosure, optionally, the first member is secured to the guide rail through a pressure guide plate, and/or a top surface of the first member and a top surface of the base are spaced at a distance of 200 to 1500 mm in the longitudinal direction.

In the elevator traction machine installation apparatus according to the present disclosure, optionally, a spacing between the at least two second members and the base on a horizontal surface of the elevator hoistway is not greater than a preset value.

In the elevator traction machine installation apparatus according to the present disclosure, optionally, the first connecting portions, the second connecting portions and the third connecting portions are configured as holes, the holes including a waist-shaped hole.

In the elevator traction machine installation apparatus according to the present disclosure, optionally, the support mechanism further comprises at least one diagonal brace member for connecting the third members and the second members, arranged close to a motor side of the elevator traction machine that is already placed on the load-bearing portion.

In the elevator traction machine installation apparatus according to the present disclosure, optionally, the distance from the first position to the second position in the longitudinal direction ranges from 100 to 750 mm.

In the elevator traction machine installation apparatus according to the present disclosure, optionally, the lifting mechanism is a scissor lifting mechanism, and/or the lifting mechanism is arranged such that the side for carrying out lifting operations is on the same side as a motor side of the elevator traction machine that is already placed on the load-bearing portion.

In the elevator traction machine installation apparatus according to the present disclosure, optionally, a vibration damper is provided between the load-bearing portion and the elevator traction machine, and/or the elevator traction machine is secured to the load-bearing portion through at least one connecting member.

In the elevator traction machine installation apparatus according to the present disclosure, optionally, the elevator traction machine installation apparatus also comprises: an extended member configured to be detachably arranged on the lifting mechanism to extend an area for placing the elevator traction machine on the load-bearing portion; and/or a baffle plate configured to be detachably covered on a side of the lifting mechanism.

In the elevator traction machine installation apparatus according to the present disclosure, optionally, the extended member is configured to be retractably connected to the load-bearing portion, and/or the baffle plate is configured to be foldable.

In addition, according to another aspect of the present disclosure, an elevator traction machine installation method is provided, which comprises the steps of: arranging the elevator traction machine installation apparatus according to any of the above in an elevator hoistway, wherein the base portion of the lifting mechanism is detachably secured at a first position on the support mechanism; placing the elevator traction machine on the load-bearing portion of the lifting mechanism, lifting the load-bearing portion and the elevator traction machine by a first distance relative to the base portion in the longitudinal direction of the elevator hoistway using the lifting mechanism, and securing the load-bearing portion in place at current position using the support mechanism; adjusting the base portion from the first position and securing it to a second position on the support mechanism, and lifting the load-bearing portion and the elevator traction machine by a second distance relative to the base portion in the longitudinal direction using the lifting mechanism, so that the load-bearing portion is substantially flush with the elevator traction machine installation position on a base for installation of a machine-room-less elevator traction machine in the elevator hoistway in the longitudinal direction; and moving the elevator traction machine from the load-bearing portion to the elevator traction machine installation position.

In the elevator traction machine installation method according to the present disclosure, optionally, it further comprises the step of: parking an elevator car at a position where top of the elevator car is not more than a preset distance from a ground before arranging the elevator traction machine installation apparatus in the elevator hoistway, and running the elevator car to an installation operation position located under the base in the longitudinal direction after suspending the elevator car above the top of the elevator car.

In the elevator traction machine installation method according to the present disclosure, optionally, it further comprises the step of: connecting the extended member detachably to an area for expansion of the load-bearing portion on the lifting mechanism before placing the elevator traction machine on the load-bearing portion.

In the elevator traction machine installation method according to the present disclosure, optionally, it further comprises the step of: covering a baffle plate detachably on a side of the lifting mechanism, and/or securing the elevator traction machine on the load-bearing portion through at least one connecting member.

In the elevator traction machine installation method according to the present disclosure, optionally, it further comprises the step of: suspending the elevator traction machine on the load-bearing portion using a suspension member, and removing the suspension member from the elevator traction machine after moving the elevator traction machine to the elevator traction machine installation position.

In the elevator traction machine installation method according to the present disclosure, optionally, the elevator traction machine installation apparatus is arranged such that the spacing between the support mechanism and the base on a horizontal surface of the elevator hoistway is not greater than a preset value.

In the elevator traction machine installation method according to the present disclosure, optionally, the distance between the first position and the second position in the longitudinal direction ranges from 100 to 750 mm, and/or the second distance is not greater than the first distance.

The applications of the present disclosure can solve the problem that a machine-room-less elevator traction machine is difficult to be effectively installed by the prior art. Not only the elevator traction machine installation apparatus according to the present disclosure is easy to manufacture, operate, use and maintain, but also the entire installation process is very simple, safe, efficient and time-saving. As compared with the prior art, the present disclosure can save up to 60% of the labor-hour, thereby facilitating the reductions of personnel allocation on the construction site and installation costs.

BRIEF DESCRIPTION OF THE DRAWINGS

The technical solutions of the present disclosure will be described in further detail below with reference to the accompanying drawings and embodiments. However, it should be understood that these drawings are designed merely for the purpose of explanation and only intended to conceptually illustrate the structures and configurations described herein, and are not required to be drawn to scale.

DETAILED DESCRIPTION

Firstly, it should be noted that the structure, composition, steps, characteristics, advantages and the like of the elevator traction machine installation apparatus and the elevator traction machine installation method according to the present disclosure will be described below by way of examples. However, neither of the descriptions should be understood as limiting the present disclosure in any way. In the text, the technical terms "first", "second" and "third" are only used for the purpose of distinguishing and are not intended to indicate the order and relative importance thereof. The technical term "connection" include connection in a direct or indirect manner, and the technical term "substantially" are intended to include non-substantive errors associated with a measurement of a specific quantity, e.g., may include ranges of +8%, +5% or +2% of a given value.

In addition, for any single technical feature described or implied in the embodiments mentioned herein, or any single technical feature shown or implied in individual drawings, the present disclosure still allows for any combination or deletion of these technical features (or equivalents thereof) without any technical obstacle. Therefore, it should be considered that these more embodiments according to the present disclosure are also within the scope recorded in this document. Furthermore, for the purpose of simplifying the drawings, the same or similar members and features may only be denoted at one or several places in the same drawing.

Referring to FIGS. 1 to 9, these figures illustrate, by way of examples, the basic configuration of an embodiment of an elevator traction machine installation apparatus of the present disclosure and the general scenario of its application to the installation of a machine-room-less elevator traction machine 200.

Figure 1:
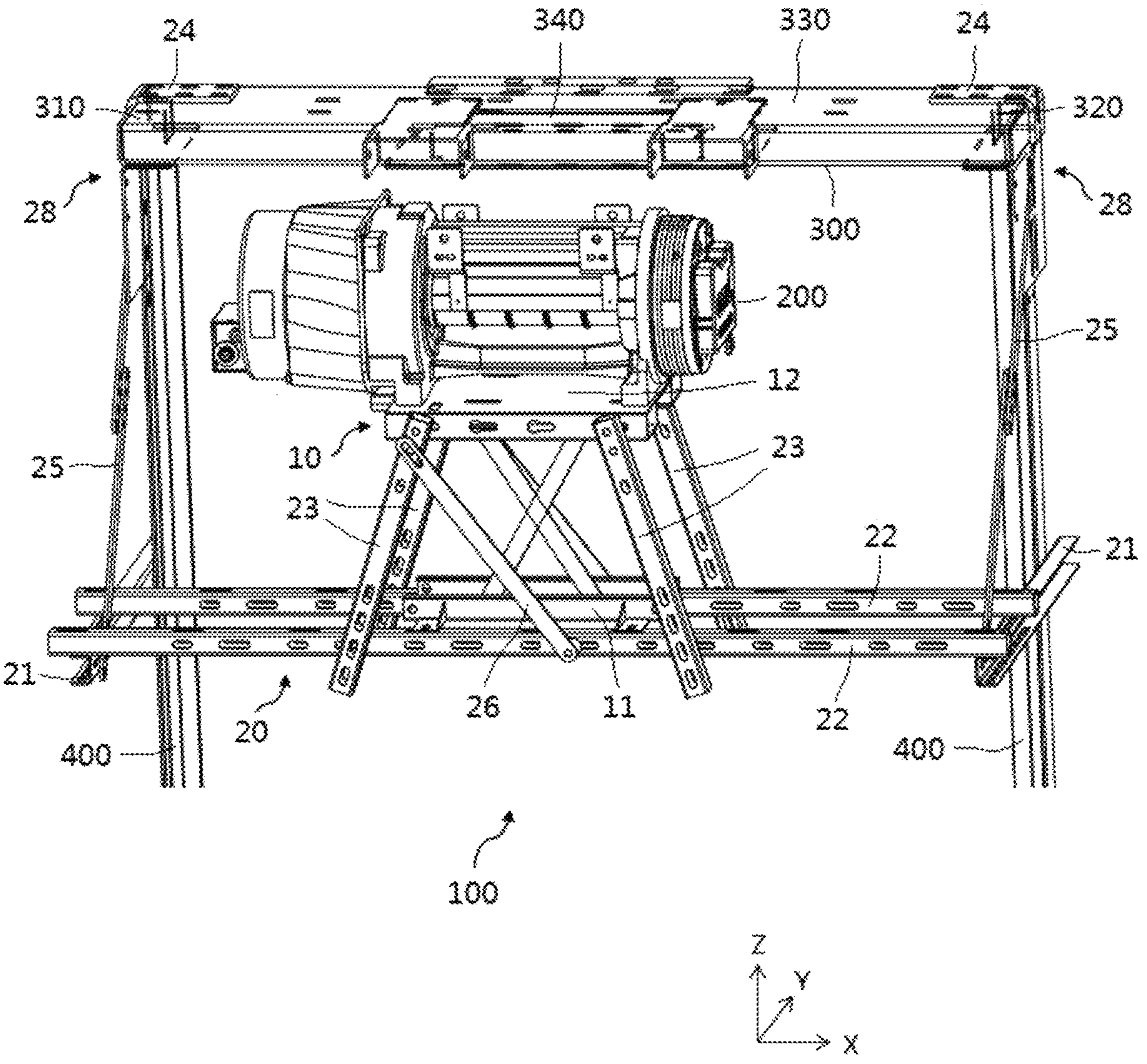
FIG. 1 is a partial scenario schematic diagram of using an embodiment of an elevator traction machine installation apparatus of the present disclosure for installation of a machine-room-less elevator traction machine.

Firstly, as shown in FIG. 1, an elevator traction machine installation apparatus 100 can be configured with two parts, namely, a lifting mechanism 10 and a support mechanism 20. The lifting mechanism 10 is connected to the support mechanism 20 and provides lifting and lowering functions. The lifting mechanism 10 can be realized in any form such as a scissor lifting mechanism, a telescopic lifting mechanism, and the like. The lifting mechanism 10 may be driven to perform lifting and lowering movements by mechanical, hydraulic and other forces exerted by a person manually or by means of an electric tool.

The lifting mechanism 10 may comprise a base portion 11 and a load-bearing portion 12 connected to the base portion 11. Generally speaking, the base portion 11 and the load-bearing portion 12 can be made of any suitable rigid material, such as steel, iron, aluminum alloy, and may be fabricated by means of feasible processes such as casting, machining, and the like. Any of the base portion 11 and the load-bearing portion 12 is allowed to be configured according to application requirements in terms of specific shape, structure, size, and the like. When in use, the base portion 11 can be directly connected to the support mechanism 20, or can be indirectly connected to the support mechanism 20 by means of an intermediate member as required, and the elevator traction machine 200 to be installed is carried by the load-bearing portion 12. The longitudinal direction Z of the elevator hoistway is schematically shown in FIG. 1. By operating a lifting and lowering operation control unit 13 on the lifting mechanism 10, one of the base portion 11 and the load-bearing portion 12 can be lifted or lowered relative to the other in the aforementioned longitudinal direction Z, as illustrated schematically in FIGS. 3, 5, 6 and other drawings.

Optionally, a vibration damper (e.g., rubber elastic pad, etc.) can be arranged between the load-bearing portion 12 and the elevator traction machine 200 to reduce vibration and shock. In addition, one or more connecting members (e.g., bolts, screws, etc.) can optionally be used to better secure the elevator traction machine 200 in place on the load-bearing portion 12 to prevent accidental sliding of the traction machine, thereby enhancing steadiness and safety. Moreover, suspension members (e.g., sling belts, cables, etc.) used to suspend the elevator traction machine 200 to place it on the load-bearing portion 12 may optionally not be removed during installation, that is, the suspension members are made to remain under stress on the elevator traction machine 200 until the installation of the elevator traction machine is completed, so as to provide secondary protection using the suspension members to further enhance system safety.

In addition, in one or some embodiments, the elevator traction machine 200 can be placed on the load-bearing portion 12 such that its motor side 210 (i.e., the side on which the motor is arranged) and the lifting and lowering operation side 14 of the lifting mechanism 10 (i.e., the side on which the lifting and lowering operation control unit 13 is arranged) are on the same side. In this way, as the motor side 210 of the elevator traction machine 200 is relatively heavier and the lifting and lowering operation side 14 of the lifting mechanism 10 has a stronger bearing capacity, arranging them on the same side will be beneficial for better weight bearing, and also beneficial for workers to pay due attention to maintaining system balance while performing lifting and lowering operations, thus improving safety and reliability. Of course, in one or some embodiments, for example, when the elevator traction machine is relatively light, the motor side 210 and the lifting and lowering operation side 14 may be arranged on opposite sides. It should be appreciated that the present disclosure allows for the selection of either same-side arrangement or opposite-sides arrangement for the two according to actual conditions.

The support mechanism 20 is configured to be detachably connected to the lifting mechanism 10 and a base 300 for installation of the elevator traction machine 200 that is already arranged in the elevator hoistway, using, for example, any or more feasible means such as bolts, screws, concave-convex matching structures. By connecting to the base 300, the support mechanism 20 can further support the lifting mechanism 10 connected to it and the elevator traction machine 200 placed on the load-bearing portion 12 during installation.

The support mechanism 20 can be used to provide two, three or more installation fixing positions for the lifting mechanism 10. For example, a first position and a second position that are selectable can be provided for the base portion 11 of the lifting mechanism 10 to secure it to the support mechanism 20, where the second position is higher than the first position in the longitudinal direction Z. With respect to the specific quantities, arrangement positions, etc. of these positions on the support mechanism 20, the present disclosure allows for designs or modifications according to different application requirements. For example, the distance between the first position and the second position in the longitudinal direction Z can be configured to range from, for example, 100 to 750 mm, or any suitable value.

Figure 2:
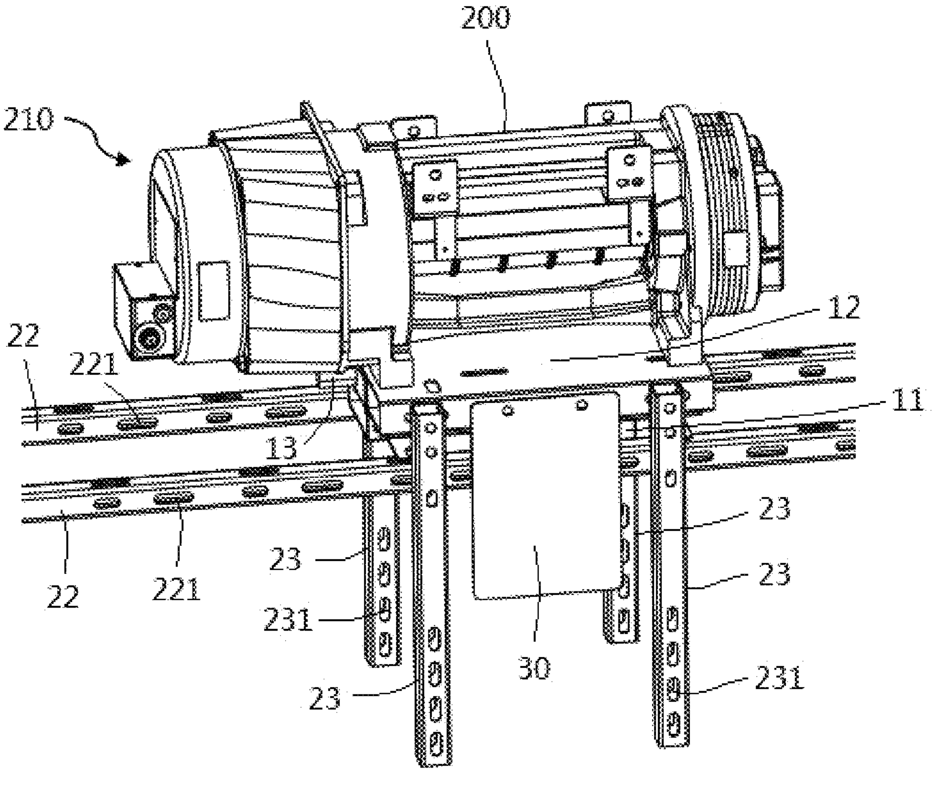
FIGS. 2 and 3 show, respectively, local three-dimensional structures of using the embodiment of the elevator traction machine installation apparatus in FIG. 1 for preparation of the first lift and for carrying out the first lift.
Figure 3:
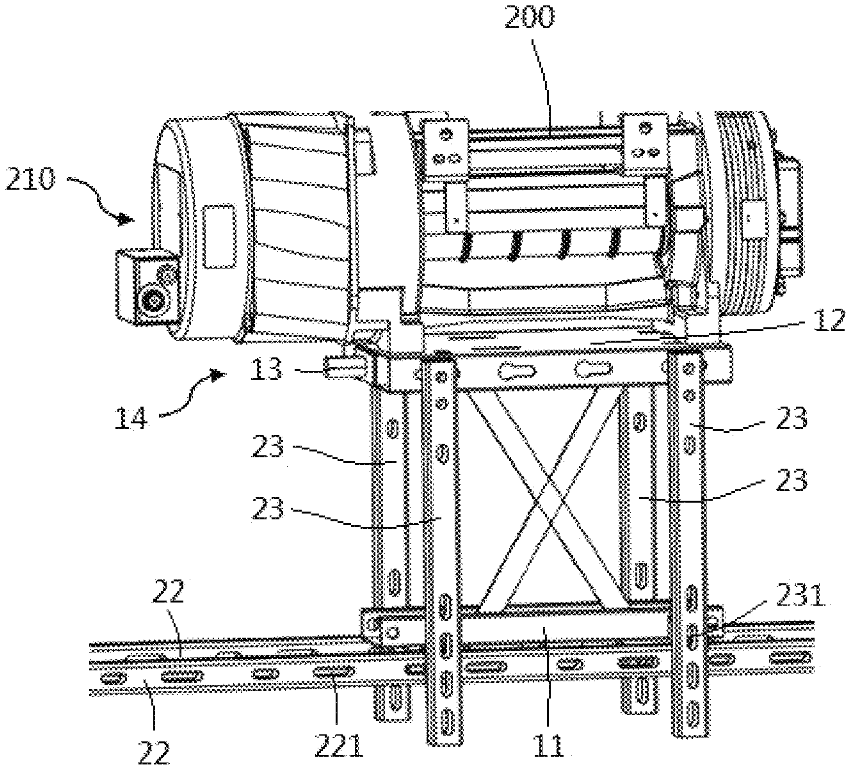
Figure 4:
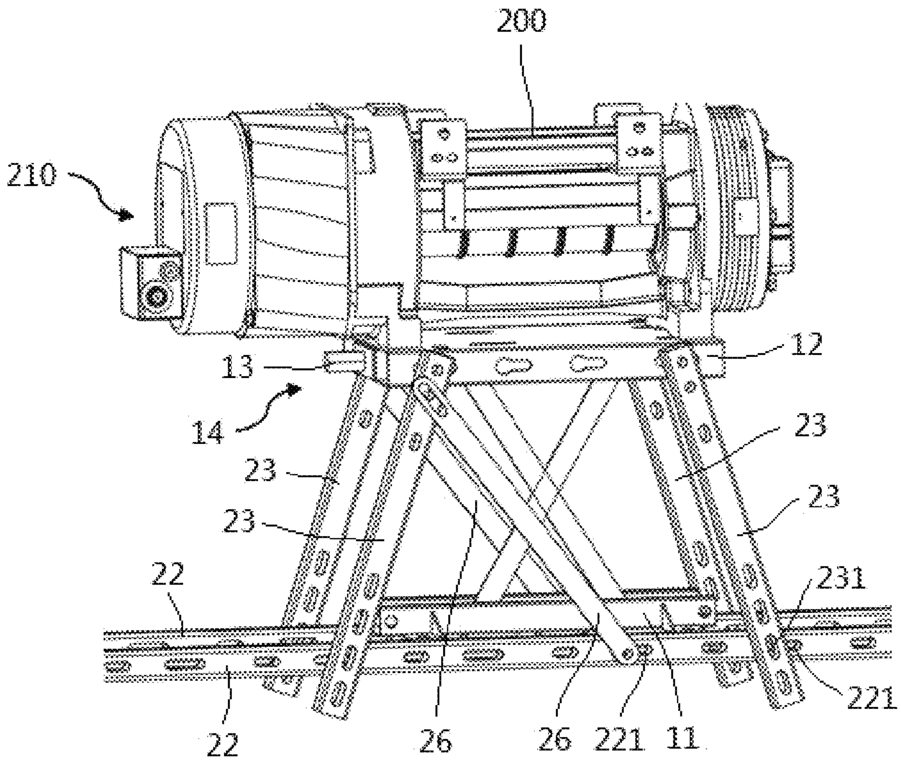
FIG. 4 shows a local three-dimensional structure of using the embodiment of the elevator traction machine installation apparatus in FIG. 1 for temporary fixing.
Figure 5:
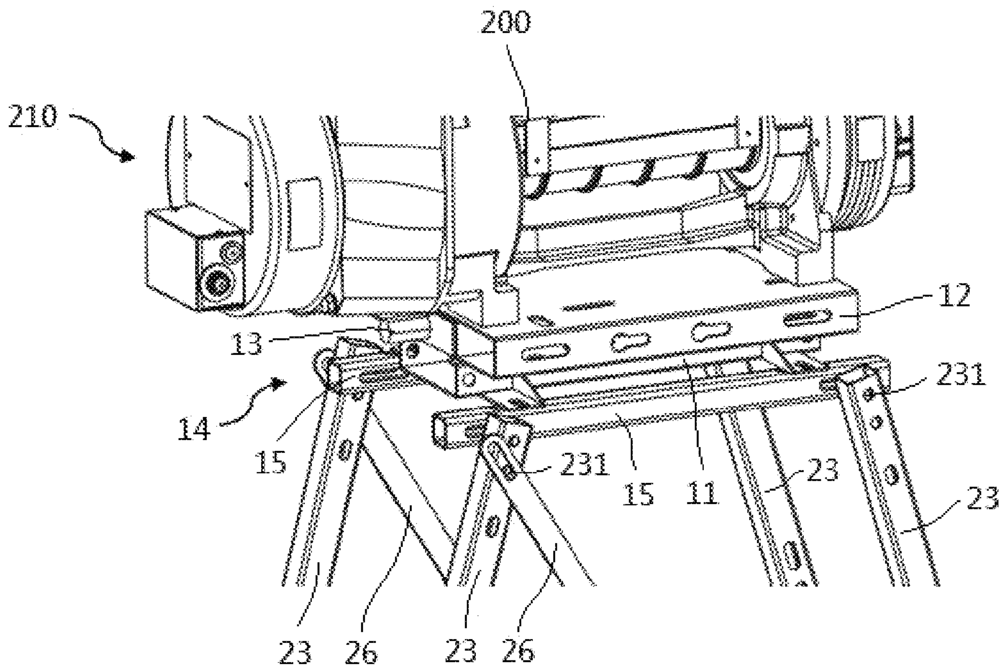
FIGS. 5 and 6 show, respectively, local three-dimensional structures of using the embodiment of the elevator traction machine installation apparatus in FIG. 1 for preparation of the second lift and for carrying out the second lift.
Figure 6:
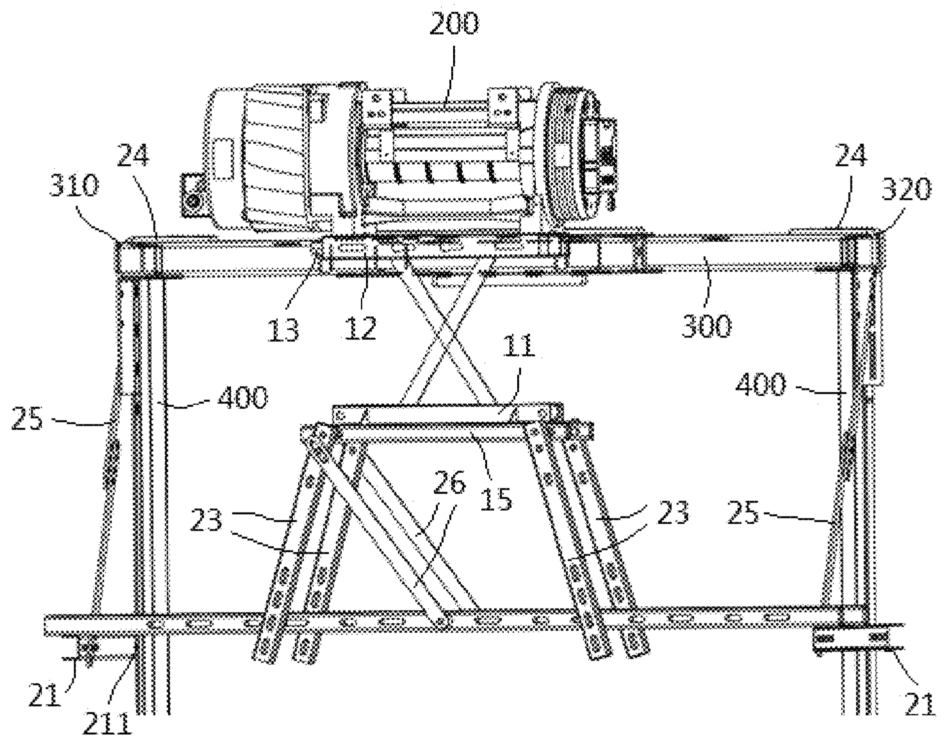
Figure 7:
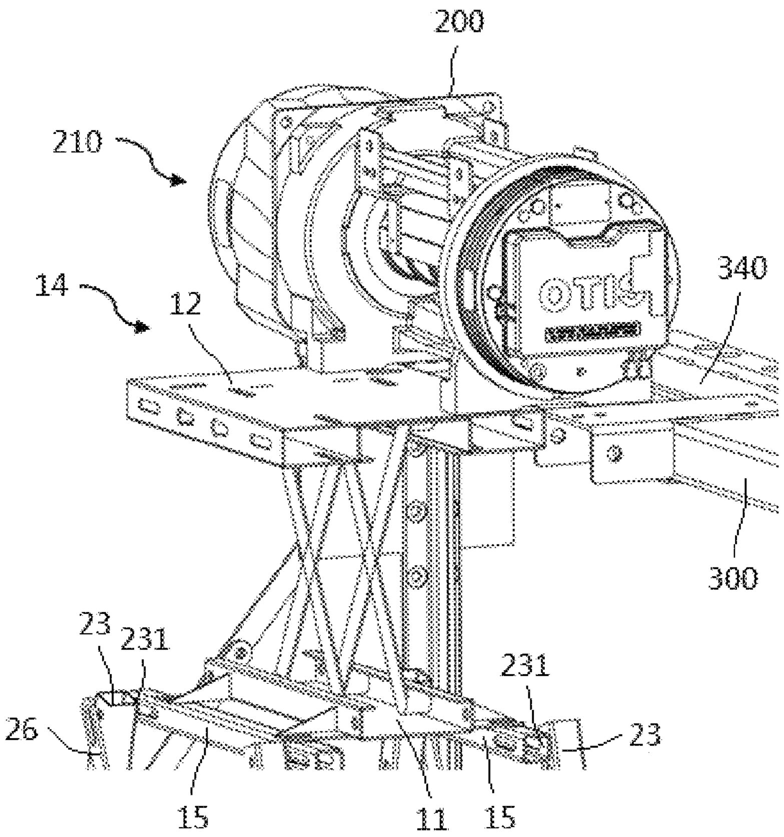
FIG. 7 shows a local three-dimensional structure of using the embodiment of the elevator traction machine installation apparatus in FIG. 1 for moving the elevator traction machine to an elevator traction machine installation position on the base.

As shown in FIG. 2, the base portion 11 can be first secured to the first position to prepare for a first lift, and then the lifting mechanism 10 is operated so that the load-bearing portion 12 is lifted by a first distance (which can be configured according to specific application requirements) with respect to the base portion 11 in the longitudinal direction Z, as shown in FIG. 3. Next, the lifting mechanism 10 may be temporarily fixed with respect to the support mechanism 20 as shown in FIG. 4. For example, the load-bearing portion 12 may be fixed with respect to the support mechanism 20, so as to allow the base portion 11 to be unfastened from the first position subsequently. And then, the base portion 11 is adjusted and fixed to a relatively higher second position to prepare for a second lift. For example, as shown in FIG. 5, the base portion 11 can be fixed in place at the second position using two intermediate members 15 at this point. Thereafter, as shown in FIG. 6, the lifting mechanism 10 is operated again so that the load-bearing portion 12 continues to be lifted for a second distance (which can be configured to be the same as or different from the first distance, e.g., may be equal to or less than the first distance) with respect to the base portion 11 in the longitudinal direction Z, until the current position of the load-bearing portion 12 is substantially flush with the elevator traction machine installation position 340 on the base 300 in the longitudinal direction Z. At this point, as shown in FIG. 7, the elevator traction machine 200 can be moved from the load-bearing portion 12 to the elevator traction machine installation position 340, and then the elevator traction machine 200 can be fixed in place on the base 300 using fixing pieces such as bolts, screws or other suitable means.

It is advantageous to install the elevator traction machine by stages using the elevator traction machine installation apparatus according to the present disclosure. This will effectively solve the installation difficulties caused by the installation conditions limited by the elevator hoistway, so that the installation space can be fully utilized by using the elevator traction machine installation apparatus to complete the whole installation process with a relatively small lift at a time. In addition, the operation is very simple, safe and efficient, which can significantly reduce the installation cost, number of workers and workload on the construction site.

As an example, with continued reference to FIGS. 1 and 9, the support mechanism 20 can be configured to have two support parts 28, two second members 22 and two third members 23, which will be described in detail below.

Specifically, the two support parts 28 may be arranged, respectively, at a first end 310 and a second end 320 that are opposite to each other on the base 300 for balanced load bearing. Each support part 28 may be provided with a first member 21, a connecting bracket 24, and a diagonal brace member 25. The connecting bracket 24 can be configured into any suitable structure such as an L-type, secured to a suitable position on the base 300 such as the top 330, and connected to the diagonal brace member 25, where the aforementioned fixed connection is allowed to be achieved using any feasible means, such as bolted connection, as required.

The first member 21 can be connected to the connecting bracket 24 via a diagonal brace member 25, and can be secured to the guide rail 400 through one or more first connecting portions 211 (e.g., in the form of a hole structure such as a circular hole, waist-shaped hole, etc.) provided on the first member 21. Optionally, the first member 21 can be secured more firmly to the guide rail 400 using suitable members such as a pressure guide plate. Guide rail 400 is normally an auxiliary guide rail extending along the elevator hoistway in an elevator system for running the elevator car. The guide rail 400 is fixedly connected to the base 300 to support the elevator traction machine 200. It should be appreciated that the base 300 can also be fixedly connected to a principle guide rail for running the elevator car in the elevator system. In addition, the first member 21 can optionally be arranged so that the distance between its top surface and the surface of the top 330 of the base 300 is 200 to 1500 mm in the longitudinal direction Z. Of course, other distance values that meet specific application requirements are also possible. It should be noted that the specific values appearing in the text should not be construed as forming any limitations on the present disclosure.

As shown in FIG. 1 and other figures, two second members 22 are arranged below the base 300, and are arranged parallel to each other along the transverse direction X of the elevator hoistway with a spacing is formed between them, where the spacing can be configured to be within a numerical range that meets the requirements of the specific application. In addition, when two second members 22 are arranged, it can be configured that the spacing between the one second member 22 that is the closest to the base 300 on the horizontal surface of the hoistway and the base 300 is as small as possible, e.g., the spacing can be selectively configured to be no more than Omm, 5 mm, 8 mm, 10 mm, 12 mm or other suitable values.

Each second member 22 is connected to the first member 21 of the two support portions 28, and two or more second connecting portions 221 (e.g., in the form of a round hole, a waist-shaped hole, and other hole structure) are provided for each second member 22, so that installation connection positions can be provided for members such as the base portion 11, the third members 23 of the lifting mechanism 10 through the second connecting portions 221, and these members can be connected using connecting members such as bolts. For example, when the base portion 11 is secured to the second member 22 via the second connecting portion 221, the first position provided by the support mechanism 20 as previously mentioned can be achieved, as illustrated in the accompanying drawings such as FIGS. 2 and 3.

Two third members 23 are arranged under the base 300, and are used to connect the lifting mechanism 10 and the second members 22 as required, e.g., to fasten the load-bearing portion 12 to the second members 22. Two or more third connecting portions 231 (e.g., in the form of circular holes, waist-shaped holes and other hole structures) may be provided on each third member 23 to provide installation connection functions for members such as the base portion 11 or load-bearing portion 12 of the lifting mechanism 10, and the third members 23. For example, the second members 22 and the third members 23 can be connected together through cooperation of the third connecting portions 231 and the second connecting portions 221 and using connecting members such as bolts. For example, when the third members 23 and the second members 22 are connected and the base portion 11 is secured to the third members 23 via the third connecting portions 231, a second position provided by the support mechanism 20 as previously mentioned can be achieved, as illustrated in the accompanying drawings such as FIGS. 5 and 6.

With continued reference to FIG. 4, optionally, one or more diagonal brace members 26 may be provided in the support mechanism 20, which can be used to further connect the third members 23 and the second members 22, thereby providing a more solid, reliable and uniform bearing support for the lifting mechanism 10 and the elevator traction machine 200. As an optional arrangement, the aforementioned diagonal brace members 26 can be installed and connected adjacent to the motor side 210 of the elevator traction machine 200. The diagonal brace members 26 can be fastened together via the second connecting portions 221 on the second members 22 and the third connecting portions 231 on the third members 23 using connecting members such as bolts. One or more diagonal brace members 26 can be arranged on one side of the lifting mechanism 10, or one or more diagonal brace members 26 may be arranged on both sides at the same time, as required.

It should be noted that the specific quantities, actual arrangement positions in application, materials used and specific constructions of the support parts 28, the second members 22 and the third members 23 in the support mechanism 20 can be flexibly configured according to the application requirements. For example, the first member 21 can be directly made of channel steel, the third member 23 and the second member 22 can be directly made of steel tube profiles, and the diagonal brace members 25 and 26 can be made of one or more segments. For example, FIG. 1 shows that the diagonal brace member 25 is made of two segments, while FIG. 4 shows that the diagonal brace member 26 is made of one segment. In addition, when using a diagonal brace member for connection, the diagonal brace member can be arranged as required on the inner side or outer side of the member to which it is connected (e.g., the connecting bracket, first member, second member or third member, etc.).

Figure 8:
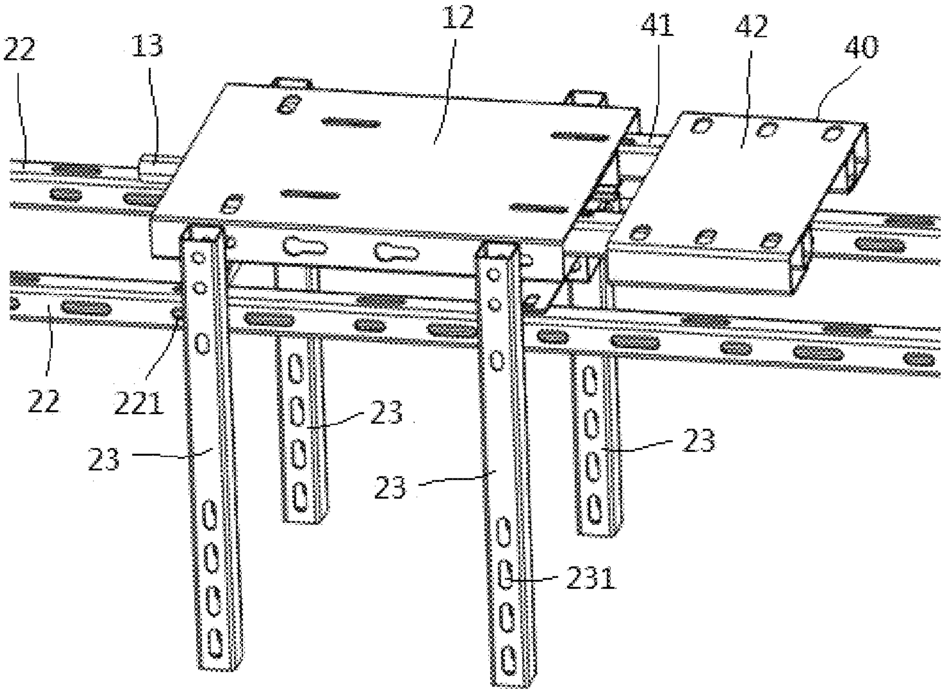
FIG. 8 is a local three-dimensional structural schematic diagram when an example of an extended member is installed in the embodiment of the elevator traction machine installation apparatus in FIG. 1.
Figure 9:
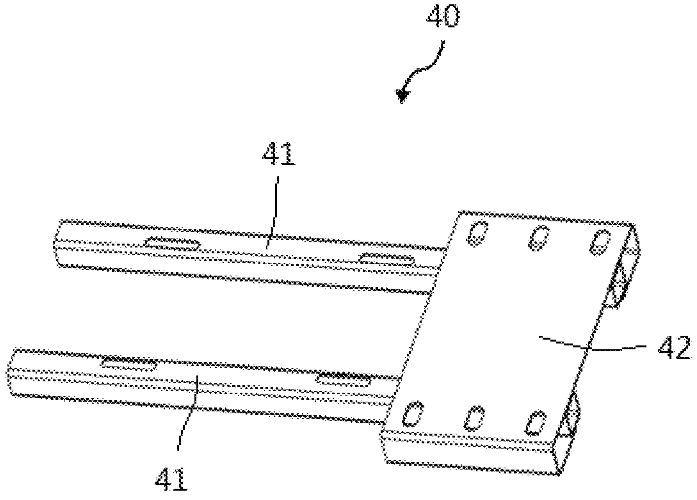
FIG. 9 is a three-dimensional structural schematic diagram of the example of the extended member in FIG. 8.

Optionally, the elevator traction machine installation apparatus 100 may also be configured with one or more additional members for further enhancing functional applications, such as the baffle plate 30 shown in FIG. 2, or the extended member 40 shown in FIGS. 8 and 9.

Specifically, the baffle plate 30 can be detachably covered on the side of the lifting mechanism 10 to provide shielding, protection, and other functions, so as to enhance the operational safety of the apparatus, and avoid undesirable situations such as injury to the workers from the lifting mechanism 10 or support mechanism 20 and damage to the apparatus due to careless and improper operations. For the extended member 40, it can be configured to be installed on the lifting mechanism 10 in a detachable manner so as to extend the area on which the elevator traction machine 200 can be placed on the load-bearing portion 12 as the application requires. For example, FIG. 8, illustrates, by way of example, that the extended member 40 can be configured to have an insertion portion 41 and a load-bearing portion 42. When the insertion portion 41 is retractably inserted into the load-bearing portion 12 and is secured with connecting members such as bolts as required, the purpose of increasing the area for placement of the elevator traction machine can be achieved by assembling the load-bearing portion 12 and the load-bearing portion 42. In addition, by adjusting the insertion length of the insertion portion 41, flexible adjustment of the above area can be further achieved.

The basic configuration, structure, and operation and use situation of the elevator traction machine installation apparatus according to the present disclosure have been described in detail above. It is not only easy to manufacture and maintain, but also very convenient to operate and use for the installation of a machine-room-less elevator traction machine. The entire installation process is quite safe, efficient, time-saving and labor-saving, and can effectively reduce installation costs. In addition, it overcomes the problem that there is barely no suitable means in the prior art to complete the on-site installation of a machine-room-less elevator traction machine.

Figure 10:
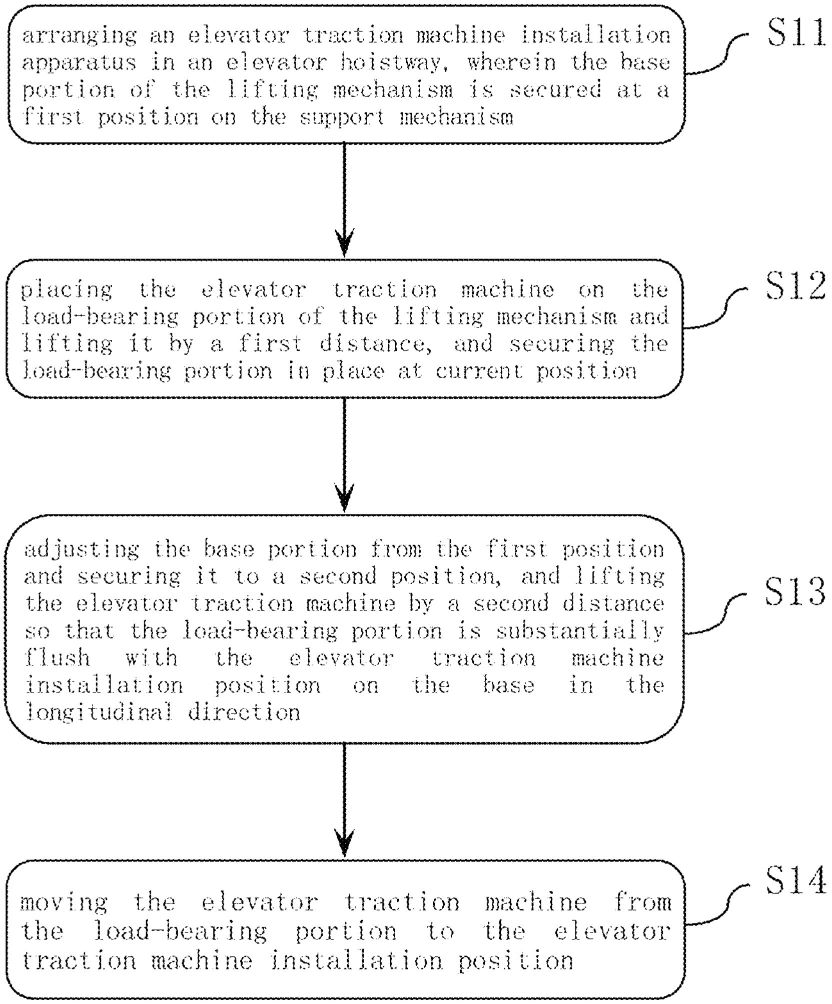
FIG. 10 is a process flow diagram of an embodiment of an elevator traction machine installation method of the present disclosure.

FIG. 10 shows basic processing steps of an embodiment of an elevator traction machine installation method of the present disclosure. Referring to FIG. 10, the following steps may be provided in the given method embodiment:

First, in step S11, the elevator traction machine installation apparatus of the present disclosure can be arranged in an elevator hoistway, where the base portion of the lifting mechanism can be secured in a detachable manner at the first position on the support mechanism to prepare for the first lift.

Next, in step S12, equipment such as a chain hoist or a hoist, or a hoist machine can be used to place the machine-room-less elevator traction machine to be installed to the load-bearing portion of the lifting mechanism, as shown in FIG. 2. Subsequently, the lifting mechanism is used to lift the load-bearing portion and the elevator traction machine located thereon along the longitudinal direction Z of the elevator hoistway for a first distance relative to the base portion of the lifting mechanism, as shown in FIG. 3. Then, the support mechanism in the elevator traction machine installation apparatus is used to secure the load-bearing portion of the lifting mechanism in place at the current position, as shown in FIG. 4. The above operations have been described in detail correspondingly previously.

In step S13, the base portion 11 can be adjusted from the aforementioned first position to be secured at a second position of the support mechanism to prepare for a second lift, as shown in FIG. 5. Then, the lifting mechanism can be used to further lift the load-bearing portion and the elevator traction machine placed thereon along the longitudinal direction Z for a second distance relative to the base portion 11, until the load-bearing portion is substantially flush with the elevator traction machine installation position on the base for installation of the machine-room-less elevator traction machine that is already arranged in the elevator hoistway in the longitudinal direction Z, which is shown schematically in FIG. 6.

Then, in step S14, the elevator traction machine can be moved from the load-bearing portion of the lifting mechanism to the elevator traction machine installation position, so that the elevator traction machine can be positioned in place on the base. Subsequently, the elevator traction machine can be fastened to the base using fixing pieces such as bolts or other suitable means according to actual needs, and the elevator traction machine installation apparatus can be removed upon completion of the installation so that it can be used for installation of another machine-room-less elevator traction machine.

It should be noted that further possible technical solutions may be provided according to the design concept of the present disclosure. For example, in one or some embodiments, before the elevator traction machine installation apparatus is arranged in the elevator hoistway, the elevator car can first be parked in the elevator hoistway at a position where the top of the elevator car is not more than a preset distance (e.g., 200 mm, etc.) to the ground. And then, the elevator traction machine can be suspended above the top of the elevator car using equipment such as a chain hoist or a hoist. Subsequently, the elevator car runs to the installation operation position under the base for installation of the elevator traction machine, so that the workers can then stand on the top of the elevator car to carry out the installation operations, such as installing the elevator traction machine installation apparatus in place, placing the elevator traction machine on the elevator traction machine installation apparatus, lifting the elevator traction machine in stages and then installing it in place, and so on. In the process of running the elevator car to the aforementioned installation operation position, the elevator traction machine suspended above the top of the elevator car can optionally be lifted up for a distance first, and then the elevator car can run up for a distance accordingly. With repetition of such operations, the above installation operation position can be reached steadily and gradually.

In addition, in one or some embodiments, the elevator traction machine can be suspended onto the load-bearing portion of the lifting mechanism by means of a suspension member (e.g., sling belts, cables, etc.), and the suspension members are not removed from the elevator traction machine until the elevator traction machine is moved into the elevator traction machine installation position or is secured in place at the position, thereby providing further safety protection on site using the suspension members. In addition, the elevator traction machine can be more firmly secured to the load-bearing portion of the lifting mechanism using one or more connecting members such as bolts, screws, concave-convex matching structures.

For another example, in one or some embodiments, an extended member may be provided, which can be connected in a detachable manner to the area for extension of the load-bearing portion on the lifting mechanism before placing the elevator traction machine on the load-bearing portion, so as to fully accommodate a large number of possible types of elevator traction machines that may have different shapes, sizes, and the like. This enables the solution of the present disclosure to have stronger practicability and wider applicability. For yet another example, in one or some embodiments, a baffle plate may be provided and, if required, arranged in a detachable manner on the side of the lifting mechanism so as to enhance system safety and better protect the workers and equipment. As for the material and composition of the baffle plate, it can be made of soft, metal and other materials, and can be constructed in a foldable form, such as in the form of a shutter, a screen, and the like.

It would be appreciated by those skilled in the art that the technical contents such as the lifting mechanism, support mechanism, extended member, baffle plate, first position, second position, first distance, second distance and various spacing settings, etc. have been described in great detail in the foregoing. Therefore, those skilled in the art can directly refer to the specific descriptions and contents of the corresponding parts as mentioned above and select the above features separately or in combination as required by the application, so as to form more possible solutions for the elevator traction machine installation method, which will not be repeated here.

The elevator traction machine installation apparatus and the elevator traction machine installation method according to the present disclosure have been described above in detail by way of examples only. These examples are merely used to illustrate the principles and embodiments of the present disclosure, rather than limiting the present disclosure. Various modifications and improvements can be made by those skilled in the art without departing from the scope of the present disclosure. Therefore, all equivalent technical solutions should fall within the scope of the present disclosure and be defined by the claims of the present disclosure.

What is claimed is:

1. An elevator traction machine installation apparatus, comprising:

a lifting mechanism having a base portion and a load-bearing portion adapted to place an elevator traction machine, wherein the base portion and the load-bearing portion are connected and configured to be capable of rising and lowering relative to each other in a longitudinal direction of an elevator hoistway; and a support mechanism configured to be detachably connected with the lifting mechanism and a base for installation of a machine-room-less elevator traction machine in the elevator hoistway to support the lifting mechanism and the elevator traction machine, and having at least two positions at which the base portion is secured, wherein a first position is lower than a second position in the longitudinal direction, and the load-bearing portion is lifted relative to the base portion after the base portion is secured at the first position, and continues to be lifted relative to the base portion after the base portion is adjusted and secured at the second position, until the load-bearing portion is substantially flush with an elevator traction machine installation position on the base in the longitudinal direction, to allow the elevator traction machine to be moved from the load-bearing portion to the elevator traction machine installation position;

wherein the support mechanism comprises:

at least two support parts each comprising a connecting bracket, a diagonal brace member and a first member, wherein the connecting bracket is secured to the base, the first member is connected to the connecting bracket via the diagonal brace member and has a first connecting portion, the first member is secured to a guide rail for installation of the machine-room-less elevator traction machine through the first connecting portion, and the guide rail is connected to the base and extends in the longitudinal direction;

at least two second members arranged below the base and in parallel to each other, and spaced in a transverse direction of the elevator hoistway, wherein the second member is connected to the first member and has at least two second connecting portions, and the base portion is secured at the first position through the second connecting portions; and at least two third members arranged below the base for connecting the lifting mechanism and the second members, wherein the third member has at least two third connecting portions, the third member and the second member are connected through the third connecting portion and the second connecting portion, and the base portion is secured at the second position through the third connecting portions.

2. The elevator traction machine installation apparatus according to claim 1, wherein two of the support parts in the support mechanism are arranged at a first end and a second end opposite to each other on the base.

3. The elevator traction machine installation apparatus according to claim 2, wherein the connecting bracket is configured in an L-shape, one part of which is secured to top of the base and the other part of which is connected to the diagonal brace member.

4. The elevator traction machine installation apparatus according to claim 1, wherein the first member is secured to the guide rail through a pressure guide plate, and/or a top surface of the first member and a top surface of the base are spaced at a distance of 200 to 1500 mm in the longitudinal direction.

5. The elevator traction machine installation apparatus according to claim 1, wherein a spacing between the at least two second members and the base on a horizontal surface of the elevator hoistway is not greater than a preset value.

6. The elevator traction machine installation apparatus according to claim 1, wherein the first connecting portions, the second connecting portions and the third connecting portions are configured as holes, the holes including a waist-shaped hole.

7. The elevator traction machine installation apparatus according to claim 1, wherein the support mechanism further comprises at least one diagonal brace member for connecting the third members and the second members, arranged close to a motor side of the elevator traction machine that is already placed on the load-bearing portion.

8. The elevator traction machine installation apparatus according to claim 1, wherein the distance from the first position to the second position in the longitudinal direction ranges from 100 to 750 mm.

9. The elevator traction machine installation apparatus according to claim 1, wherein the lifting mechanism is a scissor lifting mechanism, and/or the lifting mechanism is arranged such that the side for carrying out lifting operations is on the same side as a motor side of the elevator traction machine that is already placed on the load-bearing portion.

10. The elevator traction machine installation apparatus according to claim 1, wherein a vibration damper is provided between the load-bearing portion and the elevator traction machine, and/or the elevator traction machine is secured to the load-bearing portion through at least one connecting member.

11. The elevator traction machine installation apparatus according to claim 1, wherein the elevator traction machine installation apparatus further comprises:

an extended member configured to be detachably arranged on the lifting mechanism to extend an area for placing the elevator traction machine on the load-bearing portion; and/or a baffle plate configured to be detachably covered on a side of the lifting mechanism.

12. An elevator traction machine installation method, comprising:

arranging the elevator traction machine installation apparatus according to claim 1 in an elevator hoistway, wherein the base portion of the lifting mechanism is detachably secured at a first position on the support mechanism;

placing the elevator traction machine on the load-bearing portion of the lifting mechanism, lifting the load-bearing portion and the elevator traction machine by a first distance relative to the base portion in the longitudinal direction of the elevator hoistway using the lifting mechanism, and securing the load-bearing portion in place at current position using the support mechanism;

adjusting the base portion from the first position and securing it to a second position on the support mechanism, and lifting the load-bearing portion and the elevator traction machine by a second distance relative to the base portion in the longitudinal direction using the lifting mechanism, so that the load-bearing portion is substantially flush with the elevator traction machine installation position on a base for installation of a machine-room-less elevator traction machine in the elevator hoistway in the longitudinal direction; and moving the elevator traction machine from the load-bearing portion to the elevator traction machine installation position.

13. The elevator traction machine installation method according to claim 12, further comprising: parking an elevator car at a position where top of the elevator car is not more than a preset distance from a ground before arranging the elevator traction machine installation apparatus in the elevator hoistway, and running the elevator car to an installation operation position located under the base in the longitudinal direction after suspending the elevator car above the top of the elevator car.

14. The elevator traction machine installation method according to claim 12, further comprising: connecting the extended member detachably to an area for expansion of the load-bearing portion on the lifting mechanism before placing the elevator traction machine on the load-bearing portion.

15. The elevator traction machine installation method according to claim 12, further comprising: covering a baffle plate detachably on a side of the lifting mechanism, and/or securing the elevator traction machine on the load-bearing portion through at least one connecting member.

16. The elevator traction machine installation method according to claim 12, further comprising: suspending the elevator traction machine on the load-bearing portion using a suspension member, and removing the suspension member from the elevator traction machine after moving the elevator traction machine to the elevator traction machine installation position.

17. The elevator traction machine installation method according to claim 12, wherein the elevator traction machine installation apparatus is arranged such that the spacing between the support mechanism and the base on a horizontal surface of the elevator hoistway is not greater than a preset value.

18. The elevator traction machine installation method according to claim 12, wherein the distance between the first position and the second position in the longitudinal direction ranges from 100 to 750 mm, and/or the second distance is not greater than the first distance.

19. An elevator traction machine installation apparatus, comprising:

a lifting mechanism having a base portion and a load-bearing portion adapted to place an elevator traction machine, wherein the base portion and the load-bearing portion are connected and configured to be capable of rising and lowering relative to each other in a longitudinal direction of an elevator hoistway; and a support mechanism configured to be detachably connected with the lifting mechanism and a base for installation of a machine-room-less elevator traction machine in the elevator hoistway to support the lifting mechanism and the elevator traction machine, and having at least two positions at which the base portion is secured, wherein a first position is lower than a second position in the longitudinal direction, and the load-bearing portion is lifted relative to the base portion after the base portion is secured at the first position, and continues to be lifted relative to the base portion after the base portion is adjusted and secured at the second position, until the load-bearing portion is substantially flush with an elevator traction machine installation position on the base in the longitudinal direction, to allow the elevator traction machine to be moved from the load-bearing portion to the elevator traction machine installation position;

wherein the elevator traction machine installation apparatus further comprises:

an extended member configured to be detachably arranged on the lifting mechanism to extend an area for placing the elevator traction machine on the load-bearing portion; and/or a baffle plate configured to be detachably covered on a side of the lifting mechanism wherein the extended member is configured to be retractably connected to the load-bearing portion, and/or the baffle plate is configured to be foldable.

* * * * *